US008643202B2

(12) United States Patent
Ruan et al.

(10) Patent No.: US 8,643,202 B2
(45) Date of Patent: Feb. 4, 2014

(54) AIR CONDITION SYSTEM CAPABLE OF CONVERTING WASTE HEAT INTO ELECTRICITY

(75) Inventors: Chia-Wen Ruan, Nantou (TW); Yi-Tang Wei, Nantou (TW)

(73) Assignee: Joy Ride Technology Co., Ltd., Nantou (TW)

( * ) Notice: Subject to any disclaimer, the term of this patent is extended or adjusted under 35 U.S.C. 154(b) by 289 days.

(21) Appl. No.: 13/276,890

(22) Filed: Oct. 19, 2011

(65) Prior Publication Data

US 2012/0169067 A1 Jul. 5, 2012

(30) Foreign Application Priority Data

Dec. 30, 2010 (TW) ............................ 99146896 A

(51) Int. Cl.
*F02B 63/04* (2006.01)
*F03G 7/08* (2006.01)
*H02K 7/18* (2006.01)

(52) U.S. Cl.
USPC ...................................................... 290/1 R

(58) Field of Classification Search
USPC ..................................... 290/1 R, 50; 136/205
See application file for complete search history.

(56) References Cited

U.S. PATENT DOCUMENTS 4,380,909 A * 4/1983 Sung .................................. 62/79
5,131,238 A * 7/1992 Meckler ........................... 62/271

FOREIGN PATENT DOCUMENTS

| DE | 3402955 A1 | 11/1984 |
| DE | 102007026178 A1 | 12/2008 |
| JP | 61258907 | 11/1986 |
| TW | M390438 U1 | 5/2010 |

* cited by examiner

*Primary Examiner* — Javaid Nasri
(74) *Attorney, Agent, or Firm* — Banner & Witcoff, Ltd

(57) ABSTRACT

An air conditioning system includes an air conditioning unit and an electricity generating unit. The air conditioning unit includes an expansion valve, an evaporator, a compressor and a condenser that cooperate to form a first coolant circulating loop for circulation of a first coolant. The electricity generating unit includes a heat radiator disposed adjacent to the evaporator, a heat absorber coupled to the heat radiator and disposed adjacent to the condenser, a turbine coupled between the heat radiator and the heat absorber, and an electricity generator coupled to the turbine. The heat radiator, the heat absorber and the turbine cooperate to form a second coolant circulating loop for circulation of a second coolant. The electricity generator converts mechanical energy from the turbine into electricity.

10 Claims, 4 Drawing Sheets

AIR CONDITION SYSTEM CAPABLE OF CONVERTING WASTE HEAT INTO ELECTRICITY

CROSS-REFERENCE TO RELATED APPLICATION

This application claims priority of Taiwanese Application No. 099146896, filed on Dec. 30, 2010.

BACKGROUND OF THE INVENTION

1. Field of the Invention

The present invention relates to an air conditioning system, more particularly to an air conditioning system capable of converting waste heat into electricity.

2. Description of the Related Art

Referring to FIG. 1, a conventional air conditioning system 100 includes an expansion valve 101, an evaporator 102 coupled to the expansion valve 101, a compressor 103 coupled to the evaporator 102, a condenser 104 coupled between the expansion valve 101 and the compressor 103, two fans 105 respectively disposed adjacent to the evaporator 102 and the condenser 104, and a reservoir 106 disposed between the expansion valve 101 and the condenser 104. The expansion valve 101, the evaporator 102, the compressor 103 and the condenser 104 cooperate to form a coolant circulating loop for circulation of a coolant. The evaporator 102 is configured to absorb the heat energy from the air within an interior space, and the coolant flowing therethrough may take the heat energy from the evaporator 102 to the condenser 104. Then, the condenser 104 is configured to radiate the heat energy from the coolant to an exterior of the interior space through a corresponding one of the fans 105.

However, the heat energy radiated to the exterior will result in the greenhouse effect. The conventional air conditioning system 100 generates a relatively large amount of waste heat and radiates the waste heat into the exterior, which is detrimental to efforts to combat global warming.

SUMMARY OF THE INVENTION

Therefore, an object of the present invention is to provide an air conditioning system capable of converting waste heat into electricity.

Accordingly, an air conditioning system of the present invention comprises an air conditioning unit and an electricity generating unit.

The air conditioning unit includes an expansion valve, an evaporator coupled to the expansion valve, a compressor coupled to the evaporator, and a condenser coupled between the compressor and the expansion valve. The expansion valve, the evaporator, the compressor and the condenser cooperate to form a first coolant circulating loop for circulation of a first coolant.

The electricity generating unit includes a heat radiator disposed adjacent to the evaporator, a heat absorber coupled to the heat radiator and disposed adjacent to the condenser, a turbine coupled between the heat radiator and the heat absorber, and an electricity generator coupled to the turbine. The heat radiator, the heat absorber and the turbine cooperate to form a second coolant circulating loop for circulation of a second coolant. The turbine generates mechanical energy from flow of the second coolant through the turbine. The electricity generator converts the mechanical energy from the turbine into electricity.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
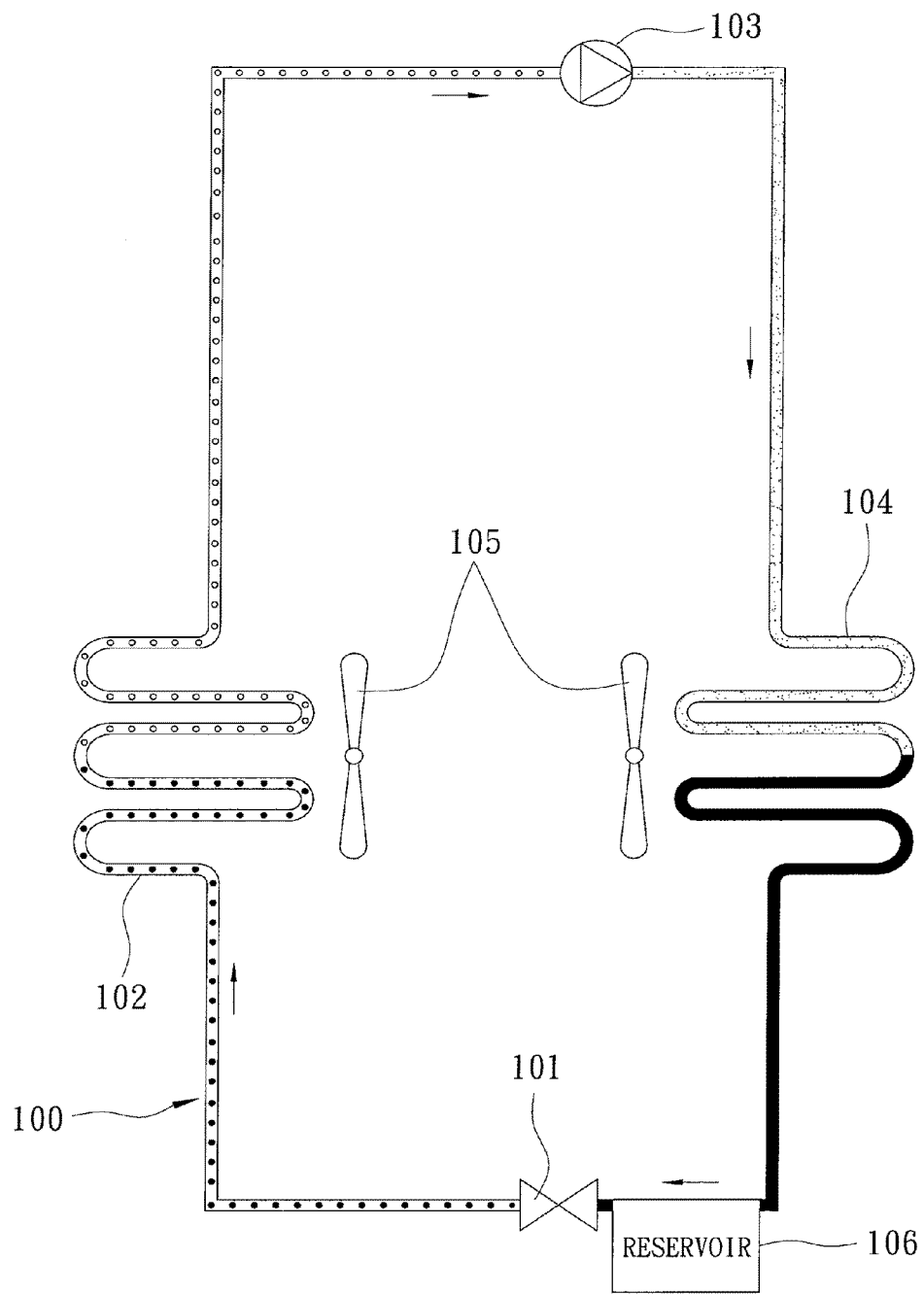
FIG. 1 is a schematic diagram illustrating a conventional air conditioning system.

Before the present invention is described in greater detail, it should be noted that like elements are denoted by the same reference numerals throughout the disclosure.

Figure 2:
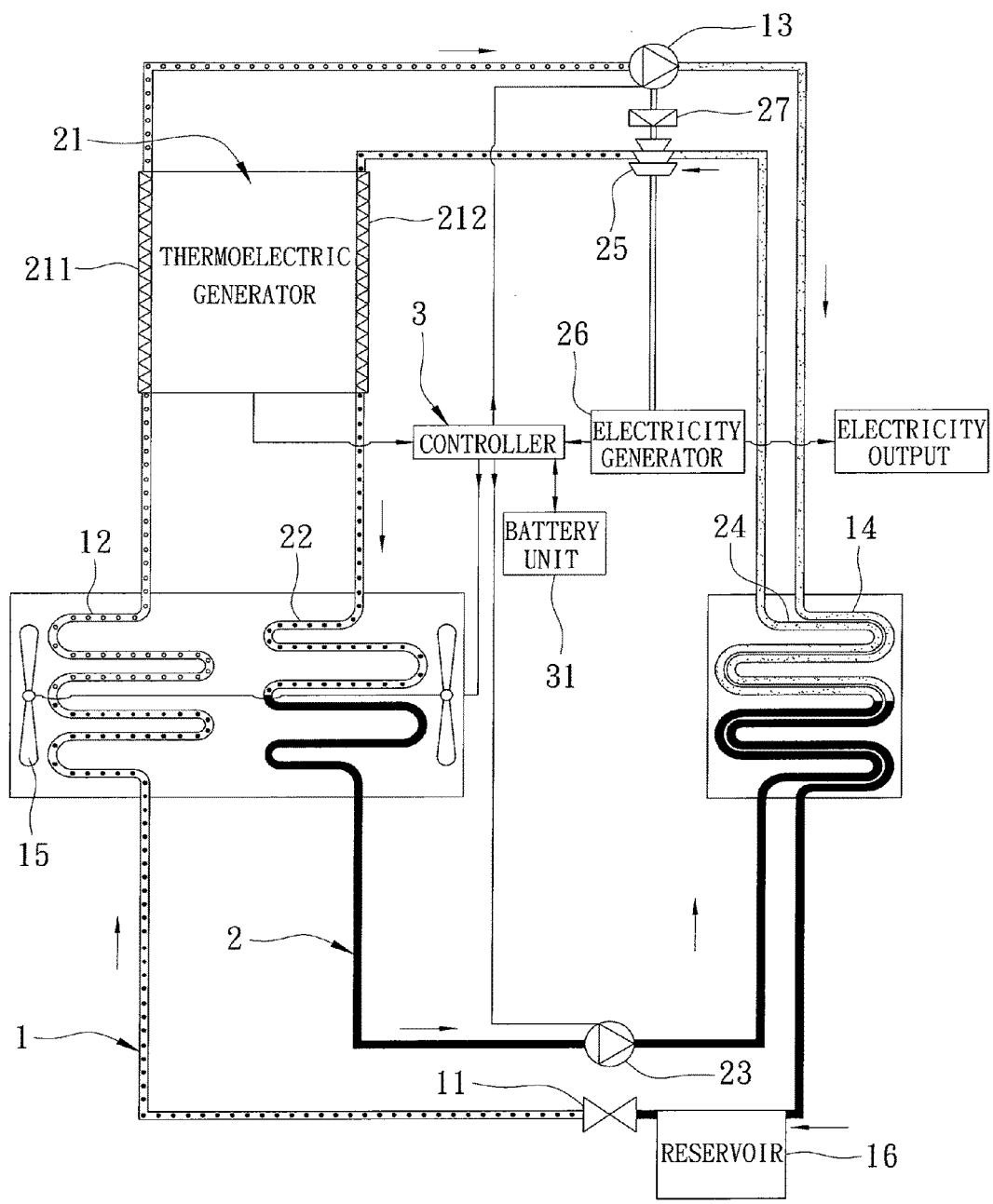
FIG. 2 is a schematic diagram of a first preferred embodiment of an air conditioning system capable of converting waste heat into electricity according to this invention.

Referring to FIG. 2, the first preferred embodiment of an air conditioning system of this invention includes an air conditioning unit 1, an electricity generating unit 2, a controller 3, and a battery unit 31.

The air conditioning unit 1 includes an expansion valve 11, an evaporator 12 coupled to the expansion valve 11, a compressor 13 coupled to the evaporator 12, and a condenser 14 coupled between the compressor 13 and the expansion valve 11. The expansion valve 11, the evaporator 12, the compressor 13 and the condenser 14 cooperate to form a first coolant circulating loop for circulation of a first coolant having a relatively lower boiling point. As an example, the first coolant is carbon dioxide. The air conditioning unit 1 further includes a fan 15 disposed adjacent to the evaporator 12, and a reservoir 16 disposed between the condenser 14 and the expansion valve 11. The evaporator 12 and the fan 15 are disposed at an air vent of the air conditioning system.

The electricity generating unit 2 includes a heat radiator 22 disposed adjacent to the evaporator 12, a coolant pump 23 coupled to the heat radiator 22, a heat absorber 24 coupled to the coolant pump 23 and disposed adjacent to the condenser 14, a turbine 25 coupled between the heat radiator 22 and the heat absorber 24, and an electricity generator 26 coupled to the turbine 25. The heat radiator 22, the coolant pump 23, the heat absorber 24 and the turbine 25 cooperate to form a second coolant circulating loop for circulation of a second coolant having a boiling point higher than the boiling point of the first coolant. As an example, the second coolant is water or ammonia. The coolant pump 23 is operable to increase pressure of the second coolant flowing in the second coolant circulating loop. The turbine 25 is operable to generate mechanical energy from flow of the second coolant through the turbine 25, and the electricity generator 26 is operable to convert the mechanical energy from the turbine 25 into electricity.

Moreover, the turbine 25 has a turbine shaft and the compressor 13 has a compressor shaft coupled to the turbine shaft using a first clutch 27, which may be an overrunning or freewheeling device, such that rotation of the turbine 25 assists in rotation of the compressor 13 and the electricity generator 26. In this embodiment, the turbine 25 and the electricity generator 26 have a common rotating shaft, so that the turbine 25 rotates to drive the electricity generator 26 to generate electricity. In other embodiments, the coolant pump 23 may coupled to the electricity generator 26 through another clutch mechanism.

In this embodiment, the electricity generating unit 2 further includes a thermoelectric generator 21 having a cold side 211 disposed for thermal exchange with the first coolant circulating loop between the evaporator 12 and the compressor 13, and a hot side 212 disposed for thermal exchange with the second coolant circulating loop between the heat radiator 22 and the turbine 25. The thermoelectric generator 21 is configured to generate electricity using a temperature difference between the cold side 211 and the hot side 212.

The controller 3 is coupled to the battery unit 31, and the thermoelectric generator 21 and the electricity generator 26 of the electricity generating unit 2, and is further coupled to the compressor 13 and the coolant pump 23. The controller 3 is operable to control supply of electricity from one of the battery unit 31, the thermoelectric generator 21 and the electricity generator 26 to the compressor 13 and the coolant pump 23. In particular, the controller 3 is operable to provide the electricity from the battery unit 31 to the compressor 13 and the coolant pump 23 during initial operation of the air conditioning system. Then, the controller 3 is operable to provide the electricity generated by the electricity generator 26 to the compressor 13 and the coolant pump 23 when the electricity generator 26 starts to generate the electricity.

During operation of the air conditioning system of this embodiment, the first coolant flowing in the first coolant circulating loop of the air conditioning unit 1 is in a high-pressure liquid state and a temperature thereof is 35° C. before the first coolant flows through the expansion valve 11. The first coolant changes to a low-pressure spray state and the temperature thereof drops to −10° C. after the first coolant flows through the expansion valve 11. Then, the evaporator 12 is configured for thermal exchange between the first coolant flowing therethrough and the air through the fan 15 so as to absorb heat energy of the air, such that the first coolant evaporates to a low-pressure gaseous state and the temperature thereof rises to −5° C. The temperature of the first coolant rises to 5° C. after the first coolant flows along the cold side 211 of the thermoelectric generator 21, and then the compressor 13 is operable to increase pressure of the first coolant such that the first coolant becomes to a high-pressure state and the temperature thereof rises to 125° C. Subsequently, the heat energy radiates from the first coolant through the condenser 14. Thus, the first coolant condenses into the high-pressure liquid state flowing to the expansion valve 11, and the temperature thereof drops to 35° C.

Regarding the second coolant circulating loop of the electricity generating unit 2, the second coolant is in a medium-pressure spray state and a temperature thereof is 60° C. before flowing along the hot side 212 of the thermoelectric generator 21. Then, the second coolant flows along the hot side 212 resulting in the temperature difference between the cold side 211 and the hot side 212 of the thermoelectric generator 21 for generating electricity, and the temperature of the second coolant drops to 50° C. The heat radiator 22 is configured for thermal exchange with the evaporator 12 and for radiation of heat energy from the second coolant flowing through the heat radiator 22 to the first coolant flowing through the evaporator 12, such that the second coolant condenses to a medium-pressure liquid state and the temperature thereof drops to 30° C.

The second coolant changes to a high-pressure liquid state after flowing through the coolant pump 23, and flows to the heat absorber 24 for absorbing the heat energy from the first coolant flowing through the condenser 14 such that the second coolant evaporates to a high-pressure gaseous state and the temperature thereof rises to 120° C. In this embodiment, since the condenser 14 and the heat absorber 24 are disposed closely adjacent to each other, the first coolant flowing in the condenser 14 directly exchanges the heat energy with the second coolant flowing in the heat absorber 24 without additional medium. Thus, the efficiency of the thermal exchange therebetween is relatively greater.

The second coolant at the high-pressure gaseous state flows through the turbine 25 such that the turbine 25 generates the mechanical energy from flow of the high-pressure second coolant, and the temperature of the second coolant drops to 60° C. after flowing through the turbine 25. Accordingly, the electricity generator 26 operates to convert the mechanical energy from the turbine 25 into electricity provided to the compressor 13 through the controller 3. Further, the rotation of the turbine 25 also assists in the rotation of the compressor 13 through the first clutch 27 when a rotation speed of the turbine shaft of the turbine 25 is faster than a rotation speed of the compressor shaft of the compressor 13.

In this embodiment, a coefficient of performance (COP) of the air conditioning unit 1 is relatively greater when ambient temperature is relatively higher. By virtue of the heat radiator 22 of the electricity generating unit 2 disposed adjacent to the evaporator 12 of the air conditioning unit 1, the COP of the air conditioning unit 1 is certainly increased to 4.5, that is to say, the air conditioning unit 1 can generate 45 kilowatts of heat energy when 10 kilowatts of electricity is provided to the compressor 13. The heat absorber 24, the turbine 25 and the electricity generator 26 of the electricity generating unit 2 cooperate to convert 20% to 30% of waste heat into electricity, i.e., approximately 9 to 13.5 kilowatts of electricity. Moreover, the thermoelectric generator 21 can generate approximately 1 to 2 kilowatts of electricity.

Figure 3:
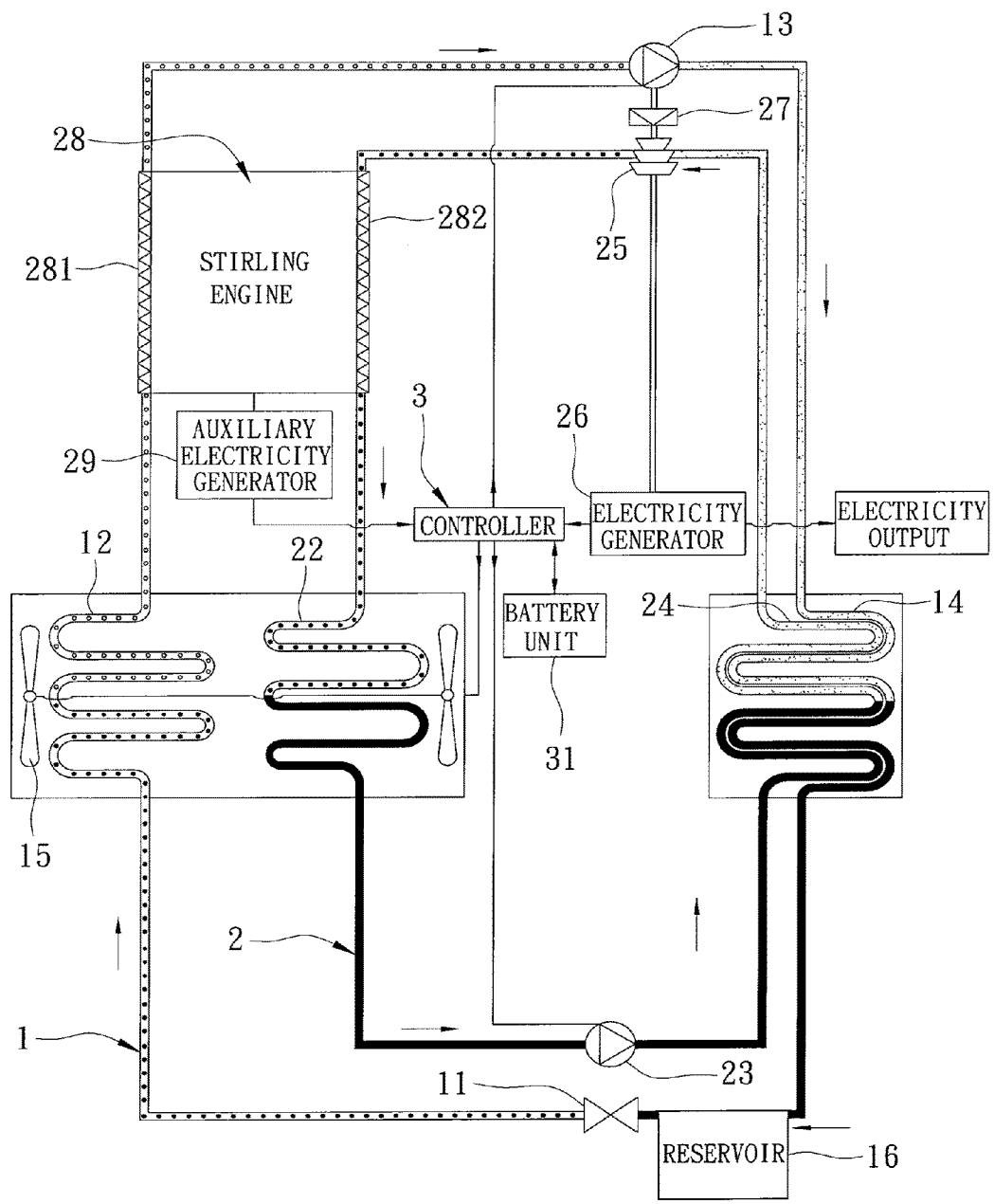
FIG. 3 is a schematic diagram of a second preferred embodiment of an air conditioning system capable of converting waste heat into electricity according to this invention.
Figure 4:
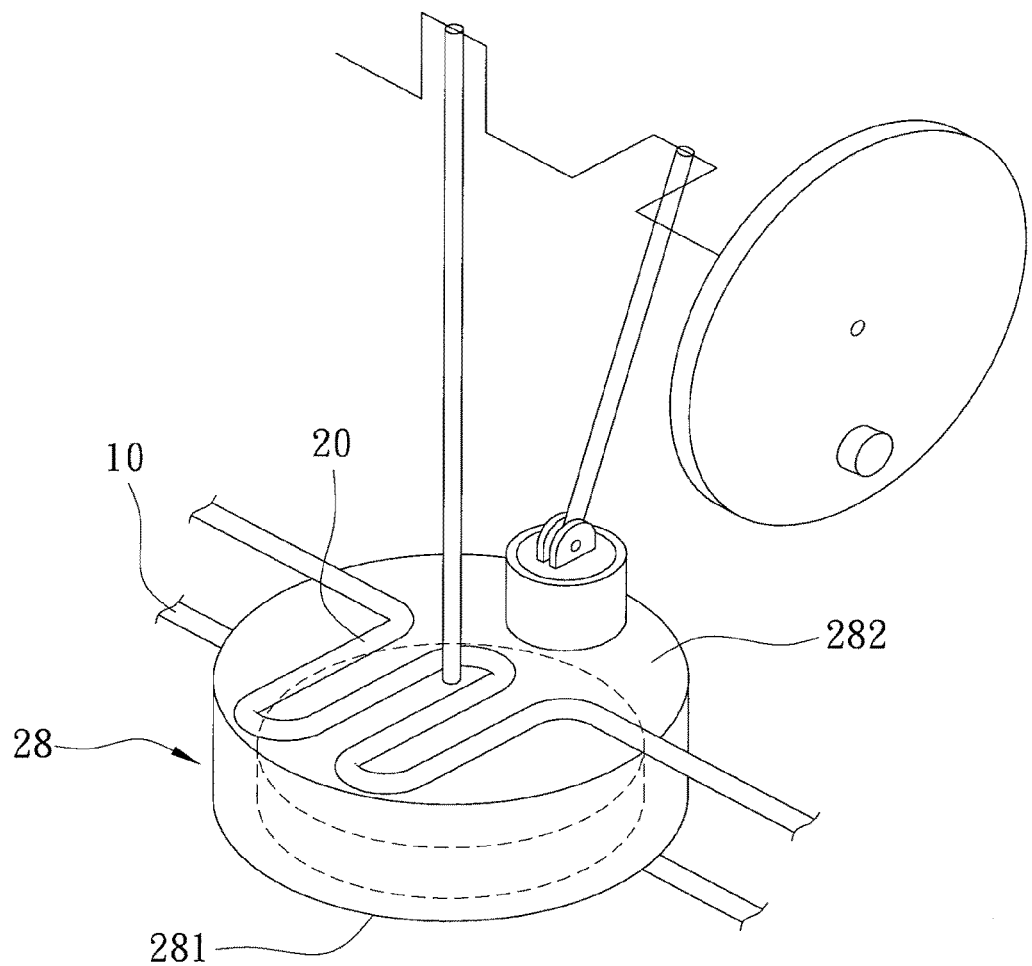
FIG. 4 illustrates a Stirling engine of the air conditioning system of the second preferred embodiment.

Referring to FIGS. 3 and 4, the second preferred embodiment of an air conditioning system of this invention is shown to be similar to the first preferred embodiment. In the second preferred embodiment, the electricity generating unit 2 includes a heat engine 28 and an auxiliary electricity generator 29 that replace the thermoelectric generator 26 of the first preferred embodiment. The heat engine 28 is capable of converting heat energy to mechanical work, and the auxiliary electricity generator 29 is coupled to the heat engine 28 for converting the mechanical work from the heat engine 28 into electricity. In this embodiment, the heat engine 28 is a Stirling engine, and has a cold side 281 disposed for thermal exchange with the first coolant circulating loop between the evaporator 12 and the compressor 13, and a hot side 282 disposed for thermal exchange with the second coolant circulating loop between the heat radiator 22 and the turbine 25. The first coolant circulating loop has a first meandering segment 10 disposed for thermal exchange with the cold side 281 of the heat engine 28, and the second coolant circulating loop has a second meandering segment 20 disposed for thermal exchange with the hot side 282 of the heat engine 28.

In summary, the second coolant circulating loop of the electricity generating unit 2 is configured for thermal exchange with the first coolant circulating loop of the air conditioning unit 1 between the cold side 211 and the hot side 212 of the thermoelectric generator 21, between the cold side 281 and the hot side 282 of the heat engine 28, between the heat radiator 22 and the evaporator 12, and between the heat absorber 24 and the condenser 14. The thermoelectric generator 21 and the heat engine 28 generate electricity via the temperature difference. The heat radiator 22 and the heat absorber 24 cooperate to absorb the waste heat from the air conditioning unit 1, and the waste heat is converted into electricity through the turbine 25 and the electricity generator 26. Thus, the electricity generating unit 2 is operable to effectively convert the waste heat from the air conditioning unit 1 into electricity.

By virtue of the heat radiator 22 disposed adjacent to the evaporator 12, the COP of the air conditioning unit 1 is certainly increased and is relatively greater with the relatively higher ambient temperature. Further, by virtue of the controller 3, the electricity generated by the thermoelectric generator 21, the electricity generator 26 and the heat engine 28 is provided to the compressor 13 and the coolant pump 23. Accordingly, the electricity consumption of the air conditioning system of this invention is relatively lower. Additionally, the remainder of the electricity can be outputted for other use.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An air conditioning system comprising:
   an air conditioning unit including an expansion valve, an evaporator coupled to said expansion valve, a compressor coupled to said evaporator, and a condenser coupled between said compressor and said expansion valve, wherein said expansion valve, said evaporator, said compressor and said condenser cooperate to form a first coolant circulating loop for circulation of a first coolant; and
   an electricity generating unit including a heat radiator disposed adjacent to said evaporator, a heat absorber coupled to said heat radiator and disposed adjacent to said condenser, a turbine coupled between said heat radiator and said heat absorber, and an electricity generator coupled to said turbine, wherein said heat radiator, said heat absorber and said turbine cooperate to form a second coolant circulating loop for circulation of a second coolant, said turbine generating mechanical energy from flow of the second coolant through said turbine, said electricity generator converting the mechanical energy from said turbine into electricity.

2. The air conditioning system as claimed in claim 1, wherein said electricity generating unit further includes a thermoelectric generator having a cold side disposed for thermal exchange with said first coolant circulating loop between said evaporator and said compressor, and a hot side disposed for thermal exchange with said second coolant circulating loop between said heat radiator and said turbine.

3. The air conditioning system as claimed in claim 2, wherein said electricity generating unit further includes a coolant pump disposed on said second coolant circulating loop between said heat radiator and said heat absorber for increasing pressure of the second coolant flowing in said second coolant circulating loop.

4. The air conditioning system as claimed in claim 3, further comprising a battery unit, and a controller that is coupled to said battery unit and said electricity generating unit, and that is further coupled to at least one of said compressor and said coolant pump, said controller controlling supply of electricity from one of said battery unit and said electricity generating unit to said at least one of said compressor and said coolant pump.

5. The air conditioning system as claimed in claim 1, further comprising a clutch, said turbine having a turbine shaft, said compressor having a compressor shaft coupled to said turbine shaft using said clutch.

6. The air conditioning system as claimed in claim 1, wherein a boiling point of the first coolant is lower than a boiling point of the second coolant.

7. The air conditioning system as claimed in claim 1, wherein the first coolant is carbon dioxide, and the second coolant is water or ammonia.

8. The air conditioning system as claimed in claim 1, wherein said electricity generating unit further includes a heat engine capable of converting heat energy to mechanical work and an auxiliary electricity generator coupled to said heat engine for converting the mechanical work from said heat engine into electricity, said heat engine having a cold side disposed for thermal exchange with said first coolant circulating loop between said evaporator and said compressor, and a hot side disposed for thermal exchange with said second coolant circulating loop between said heat radiator and said turbine.

9. The air conditioning system as claimed in claim 8, wherein said first coolant circulating loop has a first meandering segment disposed for thermal exchange with said cold side of said heat engine, and said second coolant circulating loop has a second meandering segment disposed for thermal exchange with said hot side of said heat engine.

10. The air conditioning system as claimed in claim 8, wherein said heat engine is a Stirling engine.

* * * * *